(12) United States Patent
Nir (10) Patent No.: US 6,263,125 B1
(45) Date of Patent: *Jul. 17, 2001

(54) INTEGRATED OPTICAL SWITCH ARRAY

(75) Inventor: David Nir, Tel Aviv (IL)

(73) Assignee: Lynx Photonic Networks INC, Calabasas Hills, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,675

(22) Filed: Mar. 16, 1999

Related U.S. Application Data

(63) Continuation-in-part of application No. 09/085,369, filed on May 19, 1998.

(51) Int. Cl.[7] ....................................................... G02B 6/26
(52) U.S. Cl. ............................... 385/17; 385/16; 385/20
(58) Field of Search ................................. 385/16–20, 24, 385/37, 14, 46; 359/117, 123

(56) References Cited

U.S. PATENT DOCUMENTS

| | | | |
|---|---|---|---|
| 5,493,625 | * | 2/1996 | Glance ..................................... 385/24 |
| 5,524,154 | * | 6/1996 | Bergland et al. ....................... 385/17 |
| 5,937,117 | * | 8/1999 | Ishida et al. ............................ 385/24 |
| 6,005,698 | * | 12/1999 | Huber et al. .......................... 359/117 |
| 6,067,389 | * | 5/2000 | Fatehi et al. ........................... 385/17 |
| 6,084,992 | * | 7/2000 | Weber et al. ........................... 385/24 |

* cited by examiner

Primary Examiner—Hemang Sanghavi
(74) Attorney, Agent, or Firm—Mark M. Friedman (57) ABSTRACT

An optical switch array in which at least three input waveguides are coupled to at least three output waveguides. Each of the output waveguides is coupled in the same order to each of the input waveguides by a switching element such as a 1×2 switch, via an intermediate waveguide and a combining mechanism that includes a coupling element such as a y-junction combiner. For compactness, the switching elements that couple to the same output waveguide are mutually displaced along the input waveguides. Optionally, each of the input waveguides is coupled to an auxiliary waveguide, which in turn is coupled to further output waveguides.

25 Claims, 10 Drawing Sheets

INTEGRATED OPTICAL SWITCH ARRAY

This is a continuation in part of U.S. patent application Ser. No. 09/085,369 filed May 19, 1998.

FIELD AND BACKGROUND OF THE INVENTION

The present invention relates to optical switch arrays and, more particularly, to an optical switch array, of particularly compact geometry, in which arbitrary combinations of the inputs and outputs are explicitly addressable.

Integrated optical switches are well-known. For an early review of the art, see Lars Thylen, "Integrated optics in $LiNbO_3$: recent developments in devices for telecommunications", *Journal of Lightwave Technology* vol. 6 no. 6 (June 1988), pp. 847–861. Waveguides are created in a lithium niobate substrate by processing the substrate locally to increase the index of refraction. For example, the index of refraction of lithium niobate may be increased locally by diffusing titanium into the substrate. To divert light from one waveguide to another, the waveguides are coupled by local optoelectrical manipulation of their indices of refraction. Well-known examples of optoelectrical switches include directional couplers, BOA couplers, digital-optical-switches and x-switches. Depending on the voltage applied to such a switch, light is thus partly or completely diverted from an input waveguide to an output waveguide.

Figure 1A:
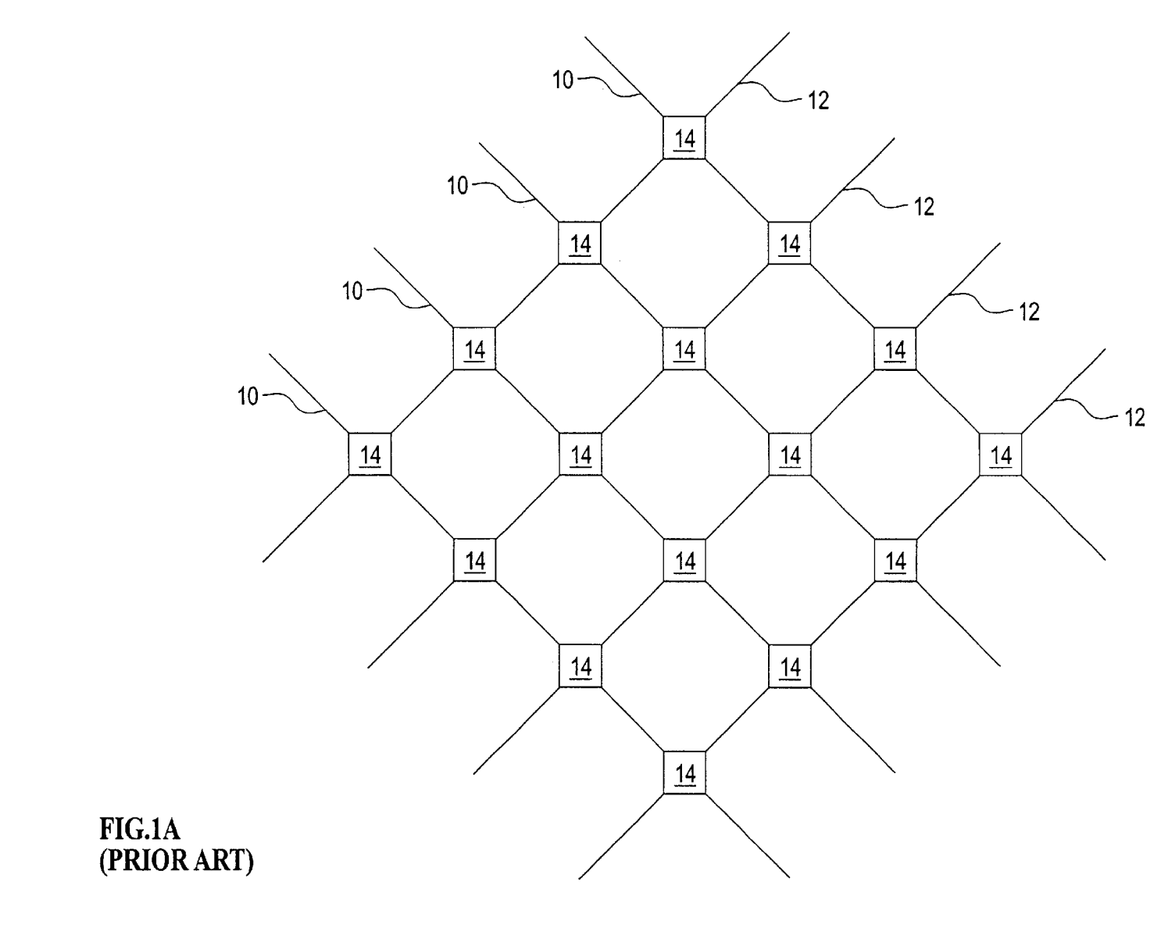
FIG. 1A (prior art) shows the geometry of a crossbar switch array.

By appropriately combining waveguides and switches, a switch array is formed to switch light from a plurality of input waveguides among a plurality of output waveguides. A variety of switch array geometries are known. FIG. 1A is a conceptual illustration of a switch array of one such geometry: crossbar geometry. A set of input waveguides 10 crosses a set of output waveguides 12. At the crossing points, the waveguides are coupled by 2×2switches 14. For simplicity, only four input waveguides 10 and four output waveguides 12 are shown in FIG. 1A. Typically the numbers of input waveguides 10 and output waveguides 12 are equal powers of 2, up to a practical maximum of 32.

Figure 1B:
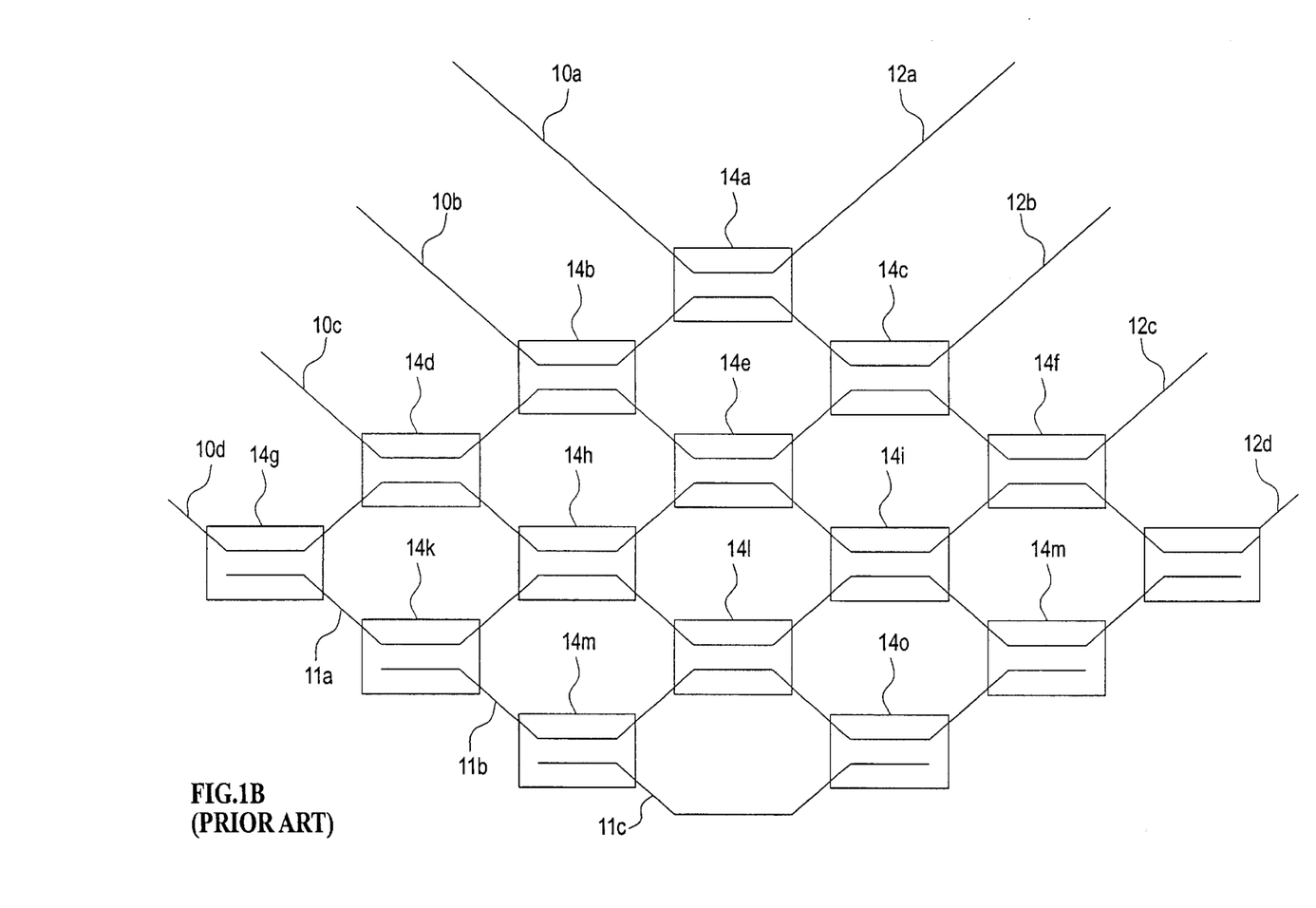
FIG. 1B (prior art) is a schematic depiction of the layout of the crossbar switch array of FIG. 1A.

FIG. 1B shows, schematically, the actual layout of the switch array of FIG. 1A. Switches 14 are shown as directional couplers, in which parallel segments of the waveguides are flanked by electrodes (not shown) to which the coupling voltages are applied. Note that input waveguide 10*a* leads directly into output waveguide 12*a*, that input waveguide 10*b* leads directly into output waveguide 12*b*, that input waveguide 10*c* leads directly into output waveguide 12*c*, and that input waveguide 10*d* leads directly into output waveguide 12*d*. To allow arbitrary coupling of inputs to outputs, three auxiliary waveguides 11*a*, 11*b* and 11*c* are provided. Waveguides 10*a*–12*a* and 10*b*–12*b* are coupled in switch 14*a*. Waveguides 10*b*–12*b* and 10*c*–12*c* are coupled in switches 14*b* and 14*c*. Waveguides 10*c*–12*c* and 10*d*–12*d* are coupled in switches 14*d*, 14*e* and 14*f*. Waveguides 10*d*–12*d* and 11*a* are coupled in switches 14*g*, 14*h*, 14*i* and 14*j*. Waveguides 11*a* and 11*b* are coupled in switches 14*k*, 14*l* and 14*m*. Waveguides 11*b* and 11*c* are coupled in switches 14*n* and 14*o*. Note that switches 14*g*, 14*k* and 14*n* actually are 1×2 switches, that switches 14*j*, 14*m* and 14*o* actually are 2×1 switches, and that there is no switch corresponding to the lowermost 2×2 switch 14 of FIG. 1A. (A 1×2 switch is a 2×2 switch with one input deactivated; a 2×1 switch is a 2×2 switch with one output deactivated.)

Switch arrays based on geometries such as the crossbar geometry of FIGS. 1A and 1B can be used to divert input signals to output channels arbitrarily. Signals from any input channels can be directed to any output channel, and even to multiple output channels, in broadcast and multicast transmission modes.

Figure 2:
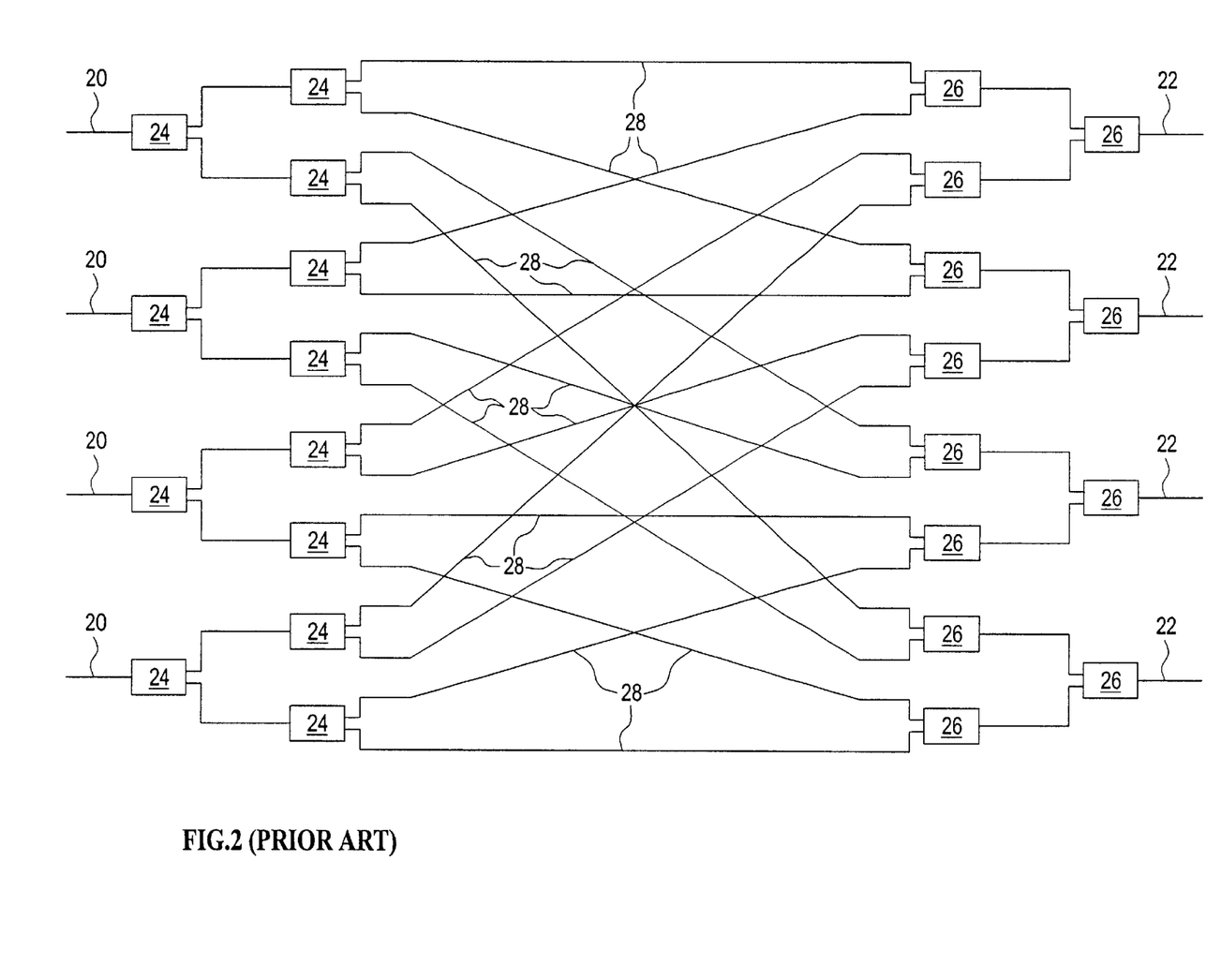
FIG. 2 (prior art) shows the geometry of a tree switch array.
Figure 3:
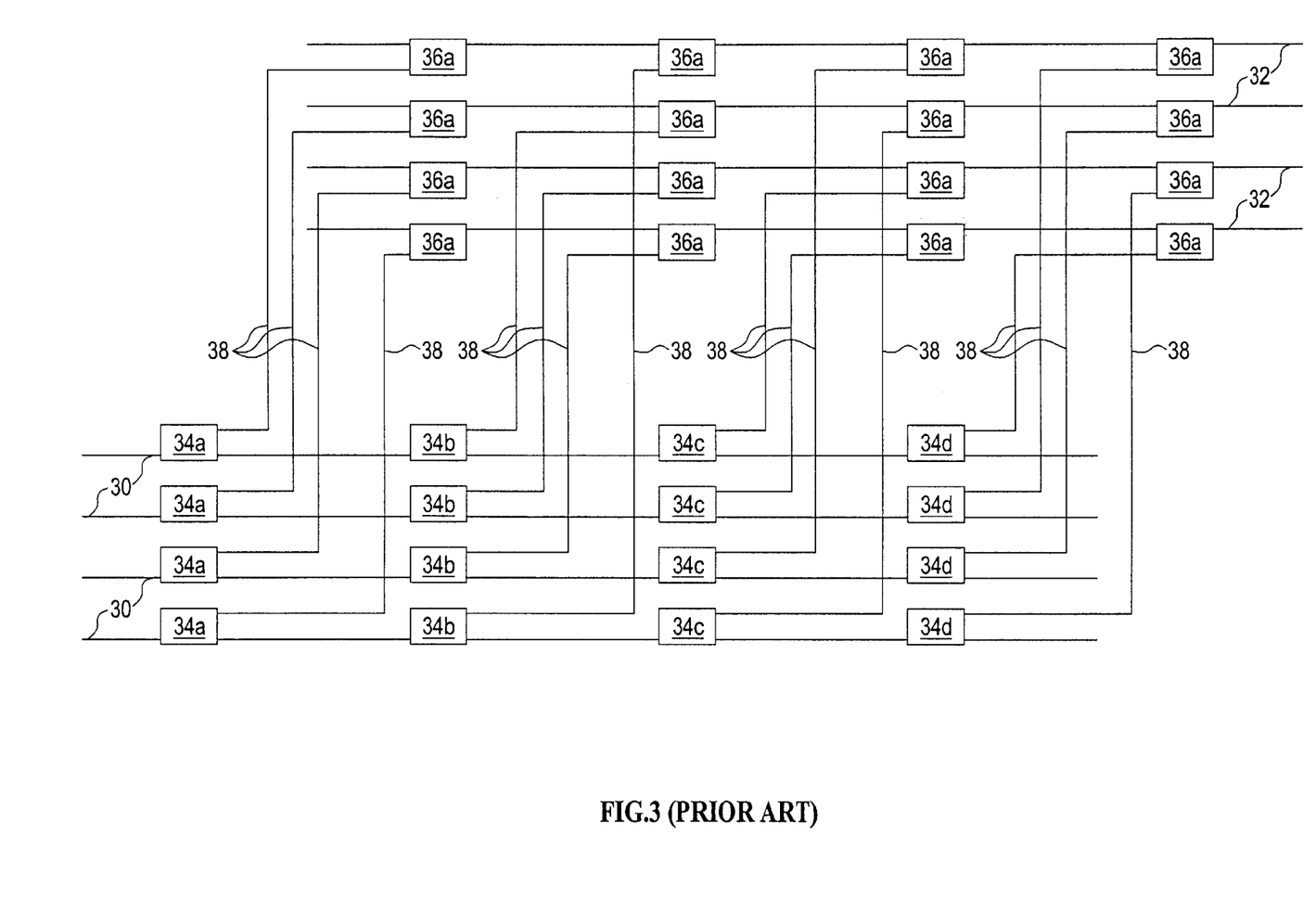
FIG. 3 (prior art) shows the geometry of a double crossbar switch array.

Despite the conceptual simplicity of the crossbar geometry of FIGS. 1A and 1B, this geometry has been found inferior, in practice, to two other geometries, the tree geometry, illustrated in FIG. 2, and the double crossbar geometry, illustrated in FIG. 3. FIG. 2 shows the tree geometry, for four input waveguides 20 and four output waveguides 22. Waveguides 20 lead into a binary tree of 1×2 switches 24. Waveguides 22 emerge from a complementary binary tree of 2×1 switches 26. The highest order branches of the binary trees are connected by intermediate waveguides 28. FIG. 3 shows the double crossbar geometry, for four input waveguides 30 and four output waveguides 32. Each input waveguide 30 traverses four 1×2 switches 34*a*, 34*b*, 34*c* and 34*d*. Each output waveguide 32 traverses four 2×1 switches 36*a*, 36*b*, 36*c* and 36*d*. The remaining outputs of switches 34 are connected to respective inputs of switches 36 by intermediate waveguides 38. Note that, in principle, switches 34*d* and 36*a* are not needed, because input waveguides 30 could lead directly to switches 36*d* and output waveguides 32 could emerge directly from switches 36*a*; but, in practice, the illustrated configuration has been found to reduce cross-talk.

The tree and double crossbar geometries require larger numbers of switches than the equivalent crossbar geometry. Nevertheless, the tree and double crossbar geometries have certain advantages over the crossbar geometry:

1. The tree and double crossbar geometries have lower worst-case crosstalk than the crossbar geometry.

2. In general, the path from a particular input waveguide to a particular output waveguide through a crossbar switch array is not unique. Therefore, computational resources must be devoted to reconfiguring a crossbar switch array in real time. In a tree switch array or in a double crossbar switch array, the path from any particular input waveguide to any particular output waveguide is unique, so it is trivial to compute how to reconfigure such a switch array in real time.

3. To prevent loss of optical power by radiation, the intermediate waveguides of an optical switch array must have gentle curvature. In the case of the crossbar geometry, this requires that the switches be arranged in a diamond pattern, as illustrated in FIGS. 1A and 1B. This is a less efficient packing of the switches than, for example, the rectangular matrix pattern of the double crossbar switch as illustrated in FIG. 3.

SUMMARY OF THE INVENTION

According to the present invention there is provided an optical switch array including: (a) at least three input waveguides; (b) a first group of at least three output waveguides; (c) for each of the output waveguides of the first group: for each of the input waveguides, a switching element coupling the each input waveguide only to the each output waveguide; and (d) for each of the output waveguides of the first group, a combining mechanism for coupling all of the input waveguides to the each output waveguide; the input waveguides, the output waveguides, the switching elements and the combining mechanism all being arranged substantially in a common plane; all of the input waveguides traversing successively respective the switching elements in a common order relative to the output waveguides of the first group.

According to the present invention there is provided a method for switching signals from at least one of at least three input channels to at least one of at least three output channels, each output channel receiving signals from only one input channel, including the steps of: (a) providing an optical switch array including: (i) at least three input waveguides, each of the input waveguides corresponding uniquely to one of the input channels, (ii) at least three output waveguides, each of the output waveguides corresponding uniquely to one of the output channels, (iii) for each of the output waveguides: for each of the input waveguides, a switching element coupling the each input waveguide only to the each output waveguide, and (iv) for each of the output waveguides, a combining mechanism for coupling all of the input waveguides to the each output waveguide, the input waveguides, the output waveguides, the switching elements and the combining mechanism all being arranged substantially in a common plane, all of the input waveguides traversing successively respective the switching elements in a common order relative to the output waveguides; and (b) for each of the output waveguides: setting the switching element, that couples the each output waveguide to the input waveguide that corresponds to the input channel wherefrom a signal is to be switched to the output channel corresponding to the each output waveguide, to divert at least a portion of the signal to the each output waveguide.

According to the present invention there is provided a method for multicasting from at least one of at least three input channel to at least two of at least three output channels, each output channel receiving input from only one input channel, including the steps of: (a) providing an optical switch array including: (i) at least three input waveguides, each of the input waveguides corresponding uniquely to one of the input channels, (ii) at least three output waveguides, each of the output waveguides corresponding uniquely to one of the output channels, (iii) for each of the output waveguides: for each of the input waveguides, a switching element coupling the each input waveguide only to the each output waveguide, thereby coupling the input channel corresponding to the each input waveguide to the output channel corresponding to the output waveguide, and (iv) for each of the output waveguides, a combining mechanism for coupling all of the input waveguides to the each output waveguide, the input waveguides, the output waveguides, the switching elements and the combining mechanisms all being arranged substantially in a common plane, all of the input waveguides traversing successively respective the switching elements in a common order relative to the output waveguides; and (b) for each output channel: setting the switching element, that couples the each output channel to the input channel wherefrom a signal is to be switched to the each output channel, to divert at least a portion of the signal to the each output channel, at least one of the switching elements being set to divert only a portion of the signal.

We have discovered that, by rearranging the connections of the double crossbar geometry of FIG. 3, a new geometry is obtained that allows a spatially more compact configuration of switches and interconnecting waveguides. Compactness is an important consideration, because it allows a larger switch array (more inputs and outputs) to be fabricated on a substrate of a given size. One substrate suffices for a switch array of the present invention that is functionally equivalent to a prior art switch array that may require two (double crossbar geometry) or three (tree geometry) substrates.

Figure 4:
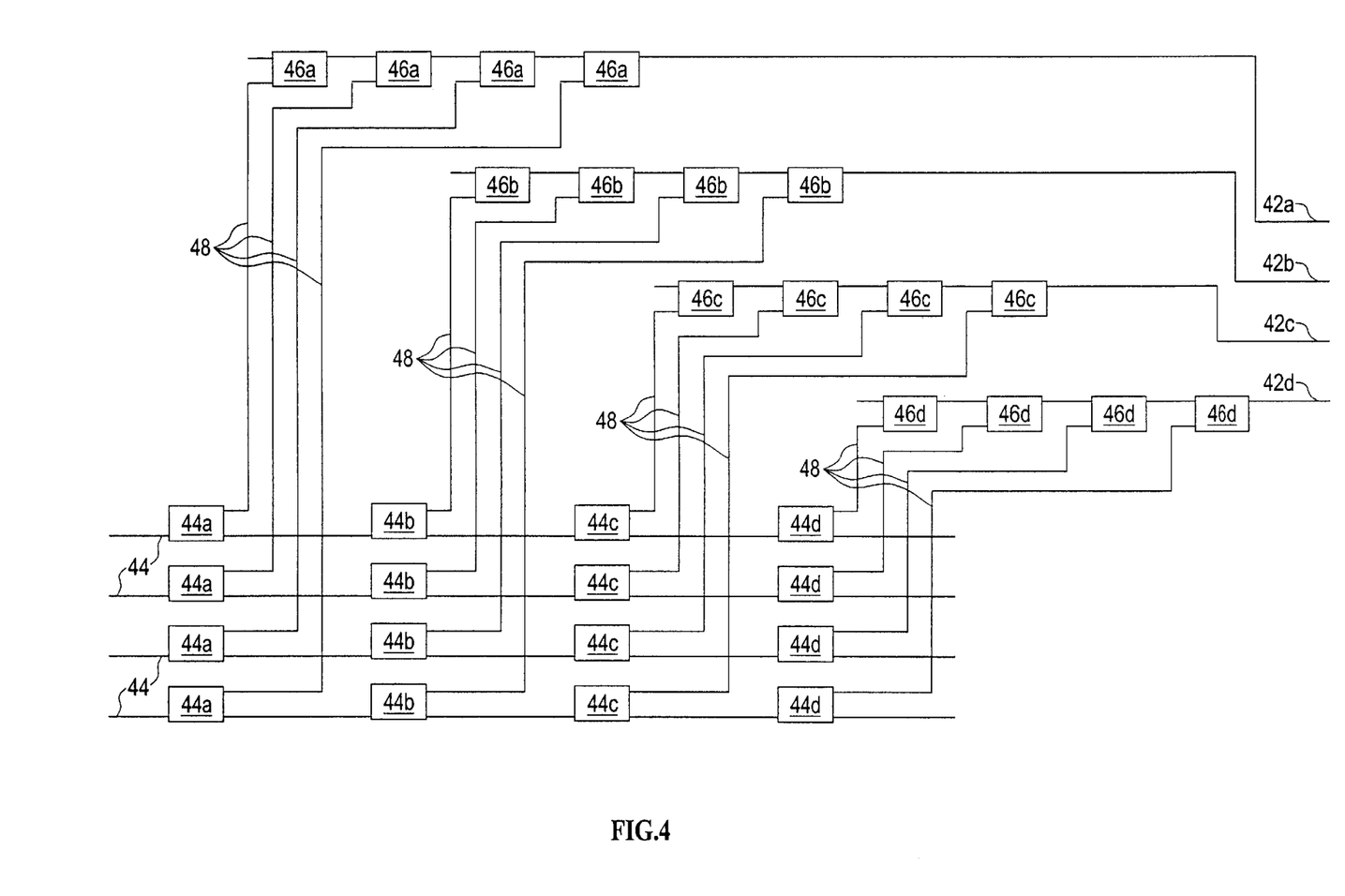
FIG. 4 shows the geometry of a switch array of the present invention.

FIG. 4 shows the geometry of a switch array of the present invention, in the case of four input waveguides 40 and four output waveguides 42. As in the double crossbar geometry of FIG. 3, each input waveguide 40 traverses four 1×2 switches 44, each output waveguide 42 traverses four 2×1 switches 46, and the remaining outputs of switches 44 are connected to respective inputs of switches 46 by intermediate waveguides 48. Unlike the double crossbar geometry of FIG. 3, switches 46a all are traversed by the same output waveguide 42a, switches 46b all are traversed by the same output waveguide 42b, switches 46c all are traversed by the same output waveguide 42c, and switches 46d all are traversed by the same output waveguide 42d, so that all input waveguides 40 are coupled to output waveguides 42 in the same order: first to output waveguide 42a, then to output waveguide 42b, then to output waveguide 42c, and finally to output waveguide 42d. This allows intermediate waveguides 48 that lead to a particular output waveguide 42 to be geometrically adjacent, with a corresponding increase in the compactness of a switch array of the present invention as compared to an equivalent double crossbar switch array.

As in the double crossbar geometry of FIG. 3, strictly speaking, 1×2 switches 44d and the first 2×1 switches 46 traversed by output waveguides 42 are not necessary, and are present only to reduce cross-talk. Co-pending U.S. patent application Ser. No. 09/085,369 teaches a similar switch array geometry, in which these switches are in fact not present.

In the days before integrated optics, Fulenwider, in U.S. Pat. No. 3,871,743, described an optical switch array having a topology similar to that of the present invention. Unlike the present invention, the particular embodiment described by Fulenwider is not well-suited to fabrication as an integrated optical device. By contrast, a switch array of the present invention is easily fabricated, essentially in a single plane, as an integrated optical device, for example on a Z-cut lithium niobate substrate.

1×2 switches 44 and 2×1 switches 46 are indicated on FIG. 4 for illustrative purposes only. More generally, the scope of the present invention includes any suitable switching element in the role of 1×2 switch 44 and any suitable coupling element in the role of 2×1 switch 46. In particular, passive y-junction combiners may be substituted for 2×1 switches 46.

To switch signals from an input channel, associated uniquely with a corresponding input waveguide, to one or more output channels, each output channel associated uniquely with a corresponding output waveguide, the output waveguides are considered in turn. For each output waveguide, the switching element that couples the input waveguide associated with the desired input channel is set to divert the appropriate portion of the input signals of that channel to the target output waveguide. If signals from other input channels are to be switched to other output waveguides, then the corresponding other switching elements associated with the target output waveguide are set to pass those signals without diversion.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an integrated optical switch array whose geometry allows it to be fabricated more compactly than similar known optical switch arrays.

The principles and operation of an optical switch array according to the present invention may be better understood with reference to the drawings and the accompanying description.

Figure 5:
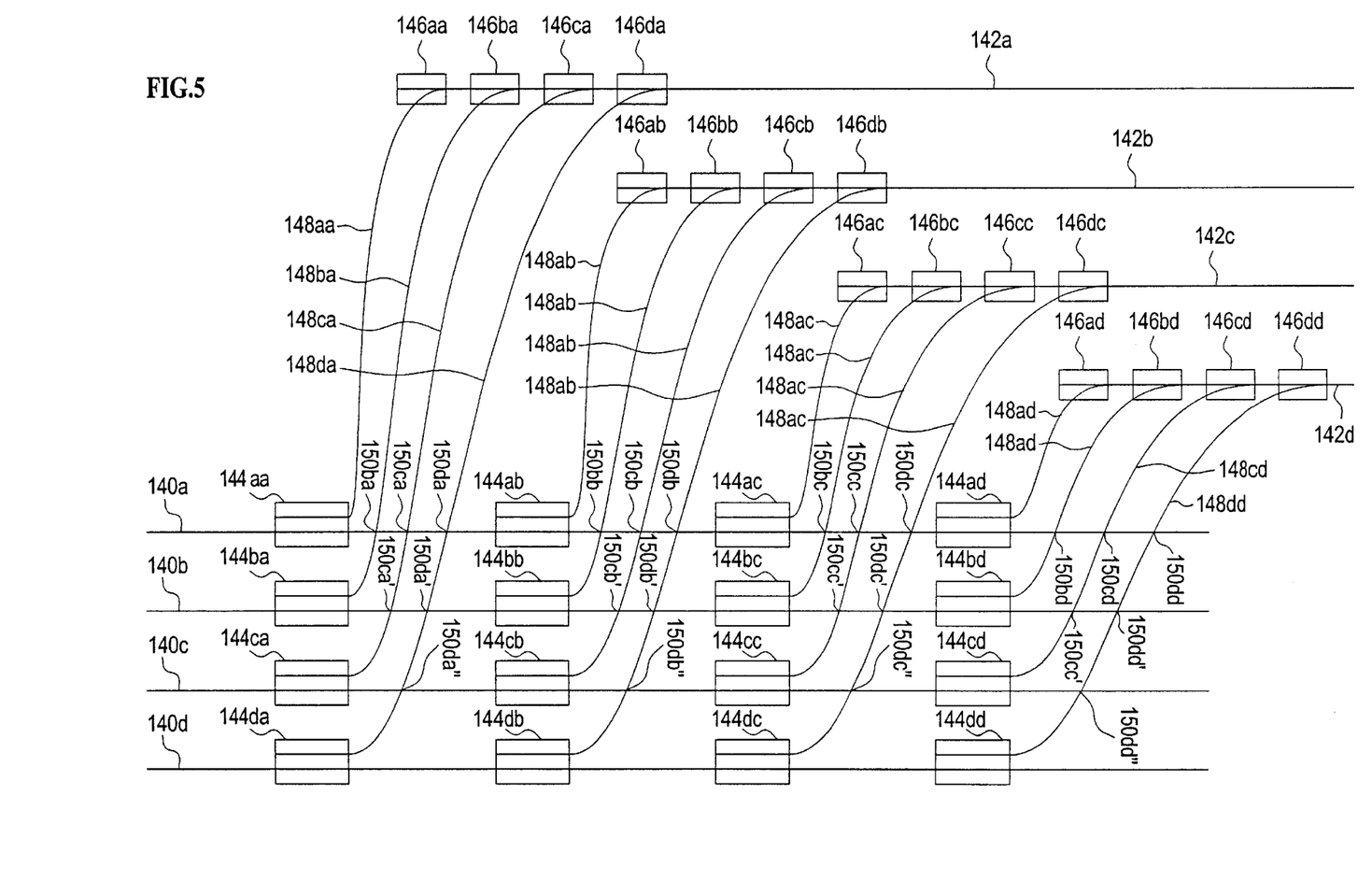
FIG. 5 is a schematic illustration of a first embodiment of a switch array of the present invention.

Referring now to the drawings, FIG. 5 is a schematic illustration of an optical switch array of the present invention, for coupling input waveguides 140a, 140b, 140c and 140d to output waveguides 142a, 142b, 142c and 142d. Input waveguide 140a is coupled to output waveguide 142a by a 1×2 switch 144aa via an intermediate waveguide 148aa and a passive y-junction combiner 146aa, to output waveguide 142b by a 1×2 switch 144ab via an intermediate waveguide 148ab and a passive y-junction combiner 146ab, to output waveguide 142c by a 1×2 switch 144ac via an intermediate waveguide 148ac and a passive y-junction combiner 146ac, and to output waveguide 142d by a 1×2 switch 144ad via an intermediate waveguide 148ad and a passive y-junction combiner 146ad. Input waveguide 140b is coupled to output waveguide 142a by a 1×2 switch 144ba via an intermediate waveguide 148ba and a passive y-junction combiner 146ba, to output waveguide 142b by a 1×2 switch 144bb via an intermediate waveguide 148bb and a passive y-junction combiner 146bb, to output waveguide 142e by a 1×2 switch 144bc via an intermediate waveguide 148bc and a passive y-junction combiner 146bc, and to output waveguide 142d by a 1×2 switch 144bd via an intermediate waveguide 148bd and a passive y-junction combiner 146bd. Input waveguide 140c is coupled to output waveguide 142a by a 1×2 switch 144ca via an intermediate waveguide 148ca and a passive y-junction combiner 146ca, to output waveguide 142b by a 1×2 switch 144cb via an intermediate waveguide 148cb and a passive y-junction combiner 146cb, to output waveguide 142c by a 1×2 switch 144cc via an intermediate waveguide 148cc and a passive y-junction combiner 146cc, and to output waveguide 142d by a 1×2 switch 144cd via an intermediate waveguide 148cd and a passive y-junction combiner 146cd. Input waveguide 140d is coupled to output waveguide 142a by a 1×2 switch 144d a via an intermediate waveguide 148da and a passive y-junction combiner 146da, to output waveguide 142b by a 1×2 switch 144db via an intermediate waveguide 148db and a passive y-junction combiner 146db, to output waveguide 142c by a 1×2 switch 144dc via an intermediate waveguide 148dc and a passive y-junction combiner 146dc, and to output waveguide 142d by a 1×2 switch 144dd via an intermediate waveguide 148dd and a passive y-junction combiner 146dd.

Waveguides 140 and 142, as well as 1×2 switches 144 and y-junction combiners 146, are fabricated by standard techniques, for example on the surface of a Z-cut lithium niobate crystal, essentially in a single plane. As a result, some of the intermediate waveguides intersect all but one of the input waveguides. Specifically, intermediate waveguide 148ba intersects input waveguide 140a at intersection 150ba; intermediate waveguide 148ca intersects input waveguide 140a at intersection 150ca and input waveguide 140b at intersection 150ca'; intermediate waveguide 148da intersects input waveguide 140a at intersection 150da, input waveguide 140b at intersection 150da' and input waveguide 140c at intersection 150da"; intermediate waveguide 148bb intersects input waveguide 140a at intersection 150bb; intermediate waveguide 148cb intersects input waveguide 140a at intersection 150cb and input waveguide 140b at intersection 150cb'; intermediate waveguide 148db intersects input waveguide 140a at intersection 150db, input waveguide 140b at intersection 150db' and input waveguide 140c at intersection 150db"; intermediate waveguide 148bc intersects input waveguide 140a at intersection 150bc; intermediate waveguide 148cc intersects input waveguide 140a at intersection 150cc and input waveguide 140b at intersection 150cc'; and intermediate waveguide 148dc intersects input waveguide 140a at intersection IS5de, input waveguide 140b at intersection 150dc' and input waveguide 140c at intersection 150dc".

1×2 switches 144 are illustrative of switching elements for coupling input waveguides 140 to output waveguides 142. The scope of the present invention includes all such switching elements. The particular 1×2 switches 144 illustrated in FIG. 2 are directional couplers. For simplicity, the electrodes of directional couplers 144 are not shown. As in the case of the prior art switch arrays, any suitable 1×2 switches, including BOA couplers, digital-optical-switches and x-switches, may be used as 1×2 switches 144.

Passive y-junction combiners 146 are illustrative of coupling elements for coupling input waveguides 140 to output waveguides 142. The difference between a "switching element" and a "coupling element", as these terms are used herein, is that a coupling element may be either passive or active, whereas a switching element is necessarily active. In FIG. 4, coupling elements 46 that couple input waveguides 40 to output waveguides 42 are active coupling elements, specifically 2×1 switches. As in the case of 1×2 switches 44 and 144, these 2×1 switches may be any suitable 2×1 switches, including directional couplers, BOA couplers, digital-optical-switches and x-switches.

The advantage of passive couplers 146 over active couplers 46 is that in an optical switch using passive couplers 146, fewer active elements need to be addressed than in an optical switch using active couplers 46. The advantages of active couplers 46 over passive couplers 146 are that a passive coupler 146 requires an elaborate design geometry to prevent loss of part of the incoming radiation to a second order mode; and that an active coupler 46 in its off state reduces crosstalk by actively blocking incoming signals from the associated intermediate waveguide 48.

In the general case of N input waveguides 40 or 140 and M output waveguides 42 or 142, an optical switch array of the present invention includes NM switching elements 44 or 144, NM coupling elements 46 or 146, and N(N−1)M/2 intersections 28.

To switch optical signals from input waveguides 40 or 140 to output waveguides 42 or 142 efficiently, with minimal losses, implementations of the optical switches of FIGS. 4 and 5 must obey certain geometric constraints. These constraints depend on the wavelength of the light used. For the commonly used wavelength of 1550 nm, the following constraints apply: Except where coupled in switching elements 44 or 144 or coupling elements 46 or 146, waveguides 40, 42, 140 and 142 should be at least about 0.5 mm apart. 1×2 switches 44 and 144 and 2×1 switches 46 typically are between 5 mm and 7 mm long. Parallel columns of 1×2 switches, for example the column including switches 44*a* and the column including switches 44*b*, should be at least about 1 mm apart. The intersection angle at intersections 150 should be such that input waveguides 140 and intermediate waveguides 148 are not coupled at intersections 150. The radii of curvature of the curved portions of intermediate waveguides 48 and 148, and the radii of curvature of the curved portions, if any, of input and output waveguides 40, 42, 140 and 142, should be at least 25 mm, and more preferably at least 30 mm. Within these geometric constraints, it is possible to fit as many as 32 input waveguides 40 or 140 and as many as 32 output waveguides 42 or 142 on the face of a Z-cut 4" diameter lithium niobate crystal.

Depending on the voltages applied to their electrodes, 1×2 switches 44 or 144 and 2×1 switches 46 may be placed in a straight-through state, in which the two channels of the switch are uncoupled, a crossover state, in which the two channels exchange signals, and any state in-between, for partial exchange of signals. In general, it is straightforward to select switch configurations to achieve any desired switching pattern of signals from input waveguides 40 or 140 to output waveguides 42 or 142. Switch configurations are selected by successive consideration of the desired output waveguides 42 or 142, taking advantage of the fact that each output channel receives input from only one input channel. For each output waveguide 42 or 142, switch 44 or 144 that couples the desired input waveguide 40 or 140 to the target output waveguide 42 or 142 is set to the state that diverts the desired portion of the input signal to the target output waveguide 142, and, if necessary, some or all of the rest of switches 44 or 144 that couple to the target output waveguide 42 or 142 are set to the straight-through state. This applies both to ordinary switching, in which signals from each input channel is switched to only one output channel, and to multicasting, in which signals from one of the input channels are split among two or more output channels. An important special case of multicasting is broadcasting, in which signals from only one input channel are distributed among all the output channels.

For example, using the embodiment of FIG. 5, and associating channel a with waveguides 140*a* and 142*a*, channel b with waveguides 140*b* and 142*b*, and channel c with waveguides 140*c* and 142*c*, suppose that it is desired to direct input signals from channel a to output on channel b, input signals from channel b to output on channel c, and input signals from channel c to output on channel a. In the leftmost column of switches 144, that couples to output waveguide 142*a*, switch 144*ca* is set to the crossover state, while switches 144*aa* and 144*ba* are set to the straight-through state. In the next column of switches 144, that couples to output waveguide 142*b*, switch 144*ab* is set to the crossover state, while switch 144*bb* is set to the straight-through state. The state of switch 144*cb* is arbitrary, because the entire incoming signal on channel c was diverted to channel a by switch 144*ca*. Finally, in the next column of switches 144, that couples to output waveguide 142*c*, switch 144*bc* is set to the crossover state. The states of the remaining switches 144 is arbitrary.

Similarly, to broadcast equally from channel a to all three output channels, switch 144*aa* is set to divert ⅓ of the incoming signal, switch 144*ab* is set to divert ½ of the incoming signal, and switch 144*ac* is set to the full crossover state. The states of the remaining switches 144 is arbitrary.

In this context, it should be noted that the switches used by Fulenwider, which consist of input gratings and acoustic beam steerers, can assume only the straight-through state and the crossover state. Partial diversion of a signal from one channel to another, as is necessary for multicasting, requires the use of more modern switches, such as the integrated optic switches used in the present invention.

Figure 6A:
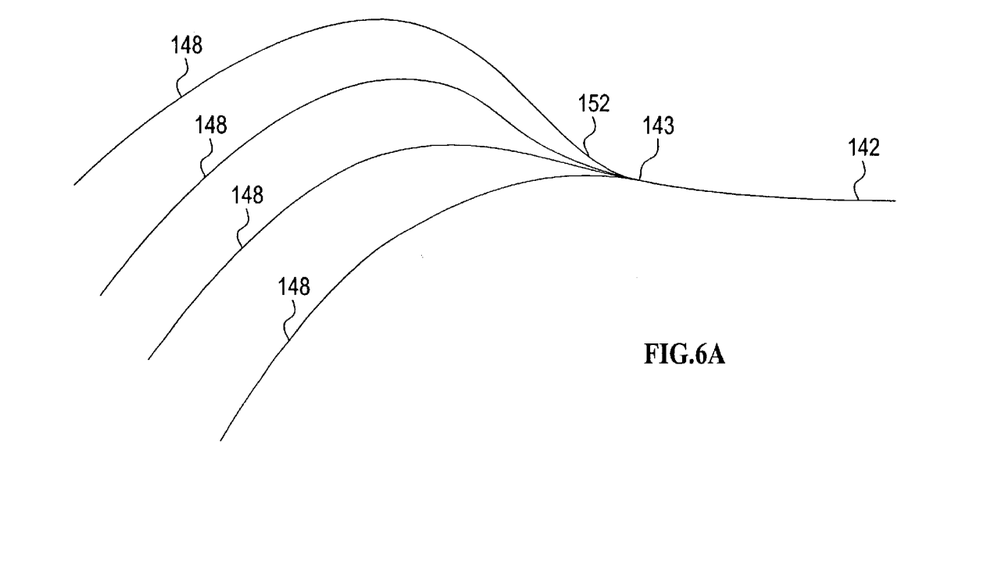
FIGS. 6A and 6B show alternate combining mechanisms.
Figure 6B:
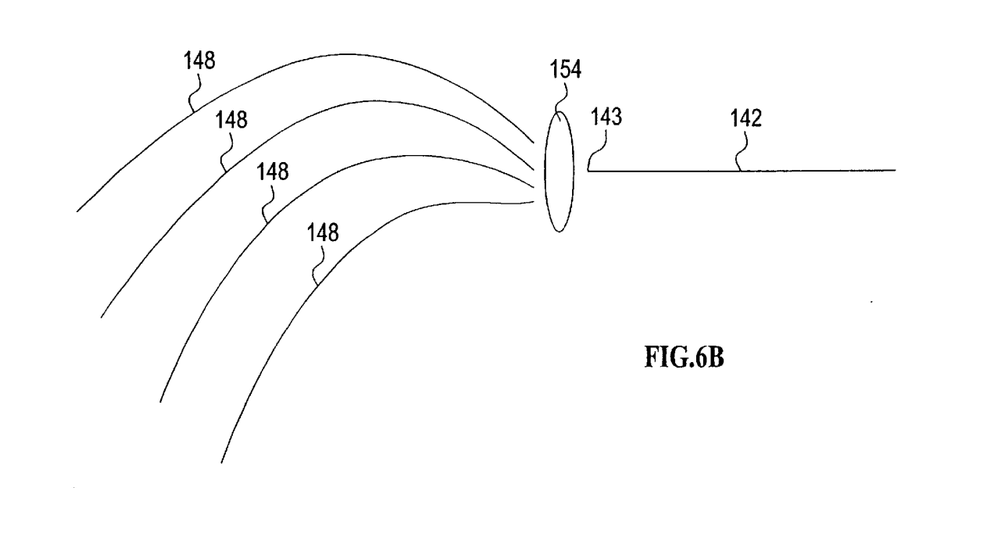

Active couplers 46*a* collectively constitute a combining mechanism for coupling input waveguides 40 into output waveguide 42*a*. Likewise, active couplers 146*aa*, 146*ba*, 146*ca* and 146*da* collectively constitute a combining mechanism for coupling input waveguides 140 into output waveguide 142*a*. Similarly, active couplers 46*b* collectively constitute a combining mechanism for coupling input waveguides 40 into output waveguide 42*b*; active couplers 46*c* collectively constitute a combining mechanism for coupling input waveguides 40 into output waveguide 42*c*; and active couplers 46*d* collectively constitute a combining mechanism for coupling input waveguides 40 into output waveguide 42*d*. Likewise, active couplers 146*ab*, 146*bb*, 146*cb* and 146*db* collectively constitute a combining mechanism for coupling input waveguides 140 into output waveguide 142*b*; active couplers 146*ac* , 146*bc*, 146*cc* and 146*dc* collectively constitute a combining mechanism for coupling input waveguides 140 into output waveguide 142*c*; and active couplers 146*ad* , 146*bd*, 146*cd* and 146*dd* collectively constitute a combining mechanism for coupling input waveguides 140 into output waveguide 142*d*. FIGS. 6A and 6B show alternative combining mechanisms.

FIG. 6A shows four intermediate waveguides 148 merging into a passive funnel structure 152 at an input end 143 of an output waveguide 142. Funnel structures 152 must be designed geometrically to minimize losses due to generation of high order modes at the funnel necks.

FIG. 6B shows four intermediate waveguides 148 coupled into input end 143 of output waveguide 144 by a planar lens 154. Planar lens 154 may be fabricated in a lithium niobate substrate by proton exchange, to locally increase the index of refraction of the lithium niobate. Planar lens 154 is shown as a refractive lens. Alternatively, planar lens 154 may be a Fresnel lens.

FIG. 5 illustrates another feature of the present invention that increases the compactness of an optical switch of the present invention, particularly when many more than the only four input waveguides 140 shown in FIG. 5 are coupled to many more than the only four output waveguides 142 shown in FIG. 5. Specifically, switching elements 144 that couple input waveguides 140 into a particular output waveguide 142 are displaced relative to each other along input waveguides 140. As drawn in FIG. 5, switching element 144*aa* is displaced rightward of switching element 144*ab*, switching element 144*ab* is displaced rightward of switching element 144*ac*, and switching element 144*ac* is displaced rightward of switching element 144*ad*. Switching elements 144*ab*, 144*bb*, 144*cb* and 144*db* that couple input waveguides 140 into output waveguide 142*b*, switching elements 144*ac*, 144*bc*, 144*cc* and 144*dc* that couple input waveguides 140 into output waveguide 142*c*, and switching elements 144*ad*, 144*bd*, 144*cd* and 144*dd* that couple input waveguides 140 into output waveguide 142*d* are mutually displaced along their respective input waveguides 140 in a similar manner. In the case of a large number of input waveguides 140 and output waveguides 142, this mutual displacement allows an intermediate waveguide 148, that couples a last (bottommost in FIG. 5) input waveguide 140 to one of output waveguides 142 (for example, output waveguide 140a), to avoid intersecting intermediate waveguides 148 that couple first (topmost in FIG. 5) input waveguides (for example, input waveguides 140a and 140b) to the next output waveguide (for example, output waveguide 142b). It will be appreciated that limiting the number of waveguide intersections, to the N(N−1)M/2 minimum number of intersections required by the geometry of the present invention, minimizes the cross-talk between input and output channels. Of course, the mutual displacement shown for switching elements 144ad, 144bd, 144cd and 144dd is not strictly necessary, because there is not "next output waveguide" following last output waveguide 142d.

Inspection of FIG. 5 also shows that the mutual displacement of switching elements 144 that couple into the same output waveguide 142 also allows intermediate waveguides 148 that lead to that waveguide 142 to be positioned closer to each other than would otherwise be possible. The upper bound on the mutual displacement of those switching elements 144 is set by the constraint that, just as parallel waveguides 140 or 142 must be separated by a minimum distance in order to prevent crosstalk, so parallel waveguides 148, that lead to the same output waveguide 142, must be separated by a minimum distance in order to prevent crosstalk.

Figure 7:
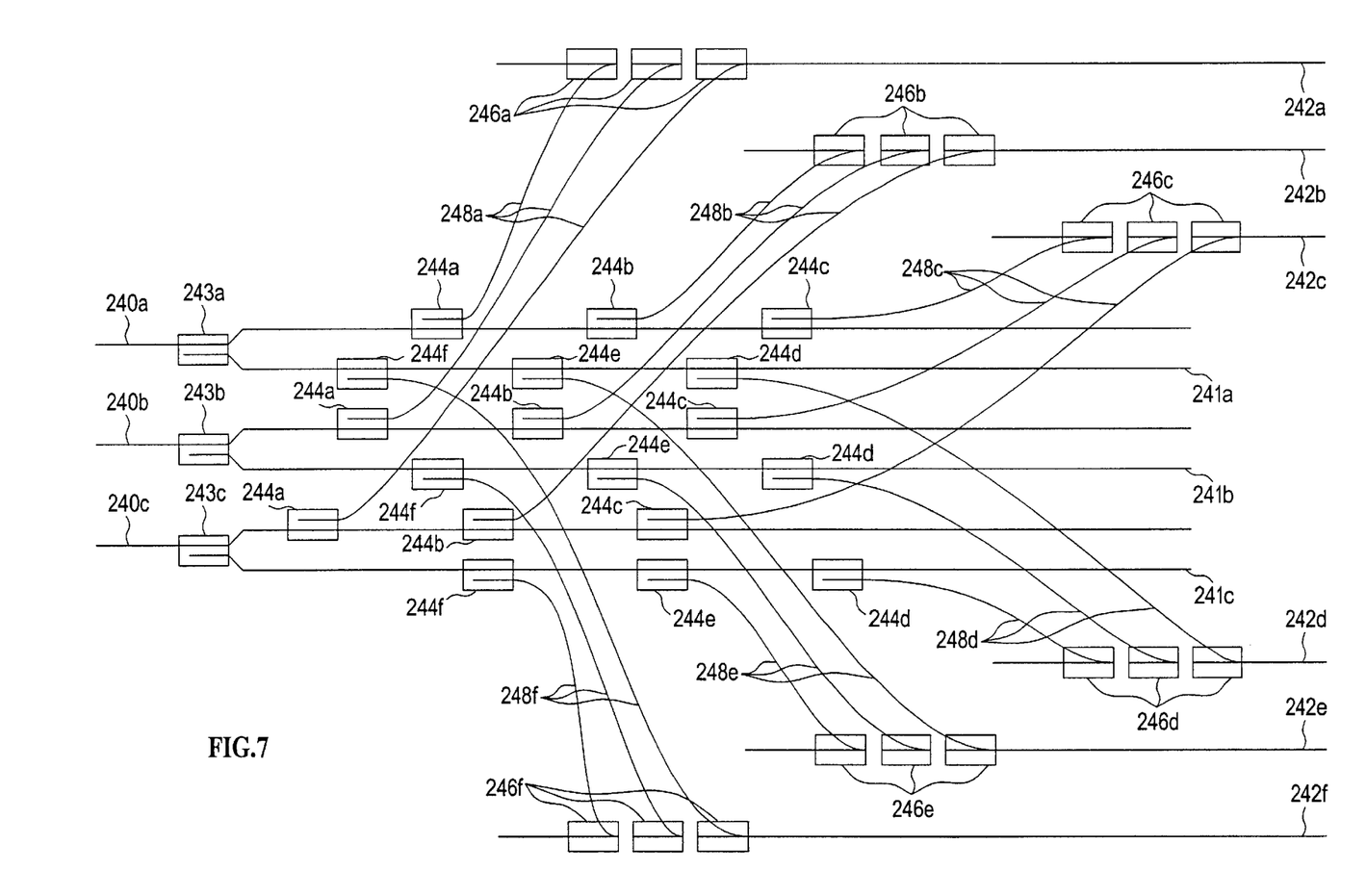
FIG. 7 is a schematic illustration of a second embodiment of a switch array of the present invention.

FIG. 7 is a schematic illustration of a second embodiment of the optical switch array of the present invention, for coupling three input waveguides 240 to six output waveguides 242. Each input waveguide 240 is coupled to a corresponding, parallel auxiliary waveguide 241 by a splitting switch 243. Input waveguides 240 are coupled to output waveguide 242a by switching elements 244a via intermediate waveguides 248a and coupling elements 246a; to output waveguide 242b by switching elements 244b via intermediate waveguides 248b and coupling elements 246b; and to output waveguide 242c by switching elements 244c via intermediate waveguides 248c and coupling elements 246c. Auxiliary waveguides 241 are coupled to output waveguide 242d by switching elements 244d via intermediate waveguides 248d and coupling elements 246d; to output waveguide 242e by switching elements 244e via intermediate waveguides 248e and coupling elements 246e; and to output waveguide 242f by switching elements 244f via intermediate waveguides 248f and coupling elements 246f. As in the embodiment of FIG. 5, switching elements 244a are mutually displaced along input waveguides 240, as are switching elements 244b and switching elements 244c. Similarly, switching elements 244d are mutually displaced along auxiliary waveguides 241, as are switching elements 244e and switching elements 244f. The configuration of FIG. 7 allows increased compactness because the two groups of intermediate waveguides 248 and output waveguides 242 branch away from input waveguides 240 on opposite sides of input waveguides 240. Because some intermediate waveguides 248d, 248e and 248f intersect some intermediate waveguides 248a, 248b and 248c, there are more intersections in the embodiment of FIG. 7 than in an equivalent embodiment configured according to FIG. 5; but this does not add appreciably to the cross-coupling because the angles of mutual intersection of intermediate waveguides 248 is about twice the angles of intersection of intermediate waveguides 248 with input waveguides 240 and auxiliary waveguides 241.

Figure 8:
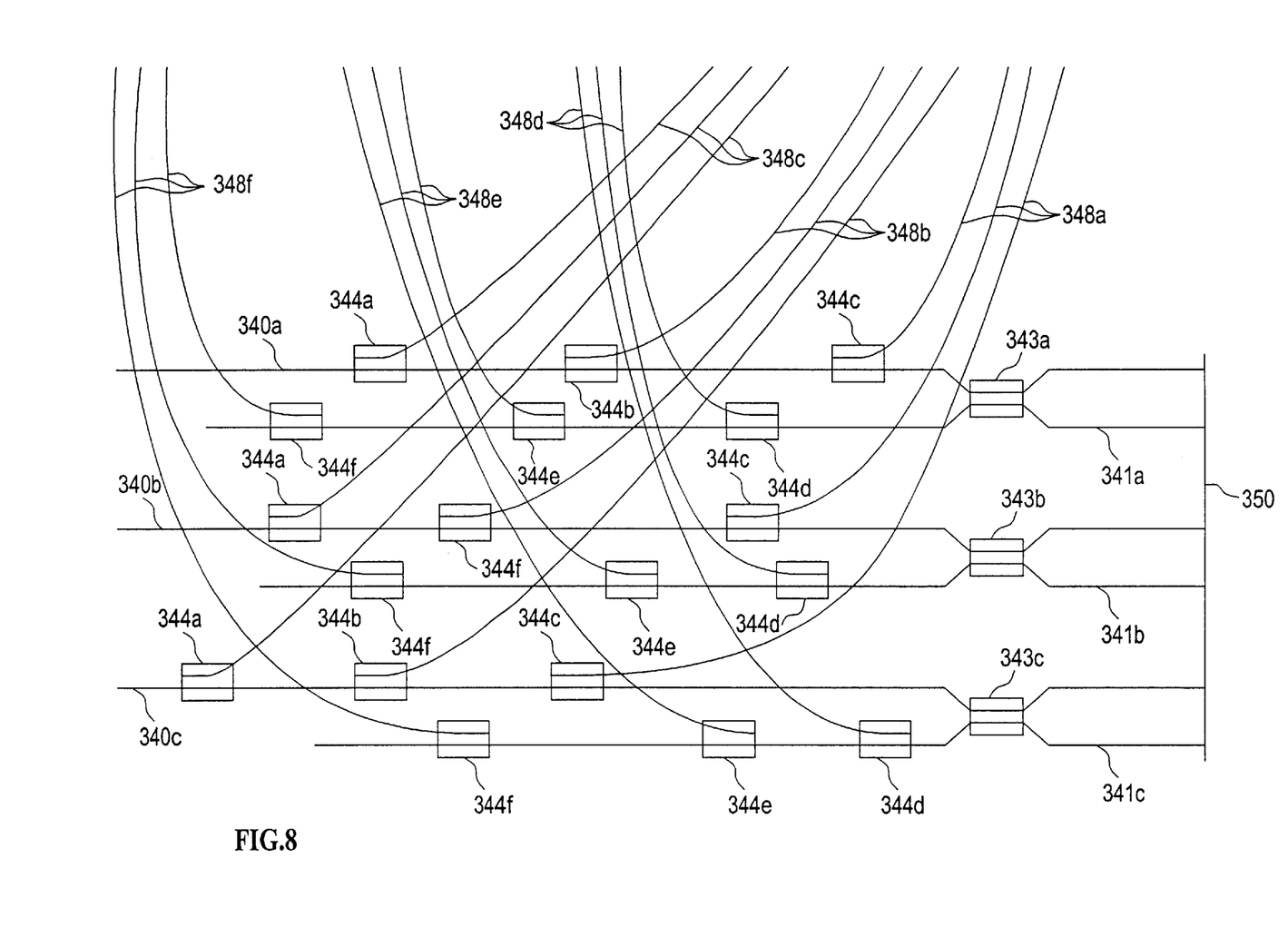
FIG. 8 is a schematic illustration of a third embodiment of a switch array of the present invention.

FIG. 8 is a partial schematic illustration of a third embodiment of the optical switch array of the present invention, for coupling three input waveguides 340 to six output waveguides (not shown). Each input waveguide 340 is coupled to a corresponding, parallel auxiliary waveguide 341 by a 50% coupler 343 and a 100% reflector 350. In effect, each auxiliary waveguide 341 is an extension of the corresponding input waveguide 340 in the opposite direction, because half the light entering an input waveguide 340 and reaching the corresponding 50% coupler 343 is coupled into the corresponding auxiliary waveguide 341, and the remaining half of the light is coupled into the corresponding auxiliary waveguide 341 by the corresponding 50% coupler 343 after reflecting off of reflector 350. Input waveguides 340 are coupled to a first output waveguide by switching elements 344a via intermediate waveguides 348a, to a second output waveguide by switching elements 344b via intermediate waveguides 348b, and to a third output waveguide by switching elements 344c via intermediate waveguides 348c. Auxiliary waveguides 341 are coupled to a fourth output waveguide by switching elements 344d via intermediate waveguides 348d, to a fifth output waveguide by switching elements 344e via intermediate waveguides 348e, and to a sixth output waveguide by switching elements 344f via intermediate waveguides 348f. As in the embodiments of FIGS. 5 and 7, switching elements 344a are mutually displaced along input waveguides 340, as are switching elements 344b and switching elements 344c. As in the embodiment of FIG. 7, switching elements 344d are mutually displaced along auxiliary waveguides 341, as are switching elements 344e and switching elements 344f. For illustrational simplicity, the output waveguides and the coupling elements that couple intermediate waveguides 348 thereto are not shown. The configuration of FIG. 8 allows increased compactness because the two groups of intermediate waveguides 348 and corresponding output waveguides branch away from input waveguides 340 in opposite directions.

If the embodiment of FIG. 8 is fabricated on the surface of a z-cut lithium niobate crystal, then reflector 350 is formed by depositing a metal coating on a flattened and polished surface perpendicular to waveguides 340 and 341, or by depositing a series of dielectric layers, appropriate to the wavelength of the light being switched, on that flattened and polished surface, or by mechanically attaching a mirror to that flattened and polished surface.

Figure 9:
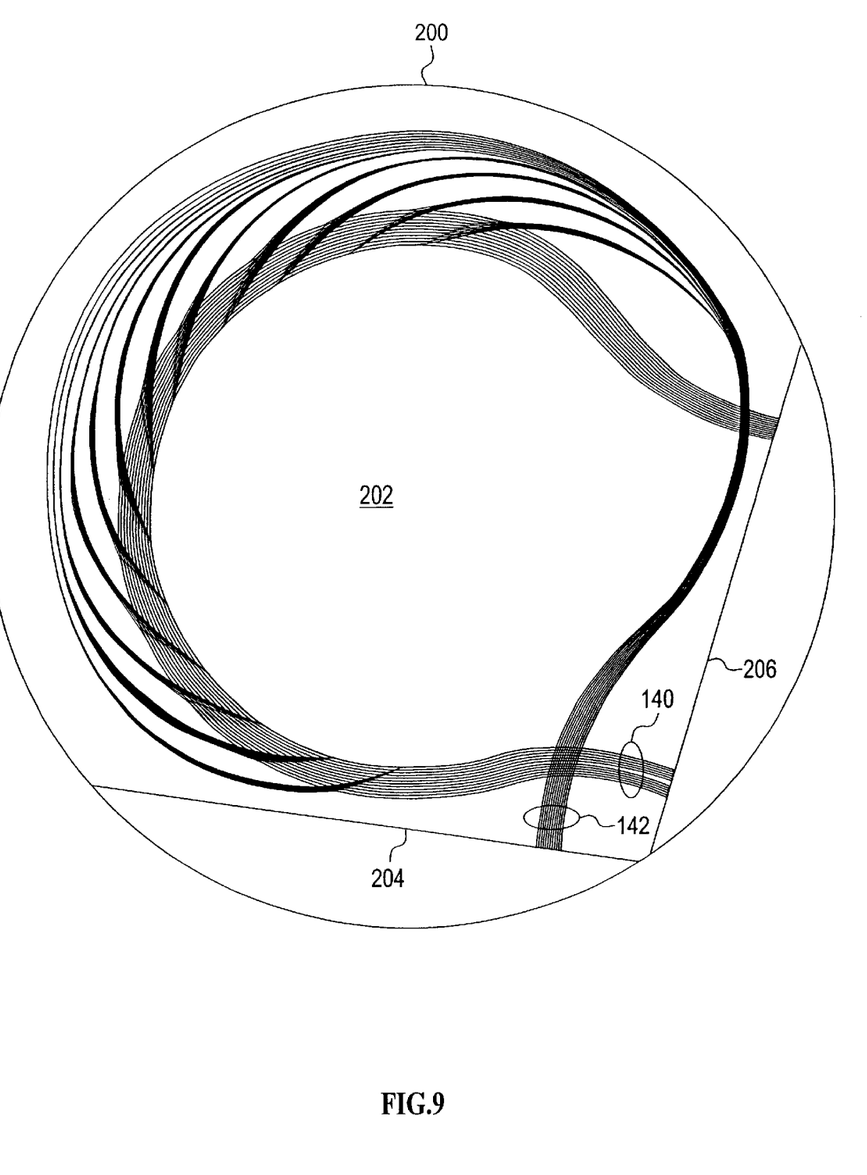
FIG. 9 shows the preferred layout of the embodiment of FIG. 5 on a surface of a z-cut lithium niobate crystal.

FIG. 9 shows the preferred layout of a switch array of the embodiment of FIG. 5, on a surface 202 of a z-cut lithium niobate crystal 200, for coupling twelve input waveguides 140 to twelve output waveguides 142. Light enters input waveguides 140 via a surface 204 that is etched perpendicular to input waveguides 140. Light exits output waveguides 142 via a surface 206 that is etched perpendicular to output waveguides 142. Waveguides 140 and 142 are curved, with a radius of curvature of about 35 mm. If waveguides 140 and 142 are straight, as drawn in FIG. 5, then input waveguides must be separated by about 0.7 mm to make sure that intermediate waveguides 148 cross input waveguides 140 at intersections 150 at at least a minimum angle θ of 11.5° to minimize cross-talk. Curving waveguides 140 and 142 as in FIG. 9 allows input waveguides 140 to be separated by only about 0.35 mm while still intersecting intermediate waveguides 148 at an angle θ of at least 11.5°.

The illustrative geometric parameters given above are for an optical switch array of the present invention that is fabricated in a lithium niobate substrate. It will be clear to those skilled in the art how to apply the present invention to other substrates, for example, polymer substrates and silica/Si substrates. In particular, the geometric constraints relevant to these other substrates will be clear to those skilled in the art While the invention has been described with respect to a limited number of embodiments, it will be appreciated that many variations, modifications and other applications of the invention may be made.

What is claimed is:

1. An optical switch array comprising:
   (a) at least three input waveguides;
   (b) a first group of at least three output waveguides;
   (c) for each of said output waveguides of said first group:
      for each of said input waveguides, a switching element coupling said each input waveguide only to said each output waveguide; and
   (d) for each of said output waveguides of said first group, a combining mechanism for coupling all of said input waveguides to said each output waveguide;
   said input waveguides, said output waveguides, said switching elements and said combining mechanism all being arranged substantially in a common plane; all of said input waveguides traversing successively respective said switching elements in a common order relative to said output waveguides of said first group.

2. The optical switch array of claim 1, further comprising:
   (e) for each of said output waveguides of said first group:
      for each of said input waveguides, an intermediate waveguide connecting said switching element, that couples said each input waveguide to said each output waveguide, to said combining mechanism;
   all of said intermediate waveguides being arranged substantially in said common plane.

3. The optical switch array of claim 2, wherein each said intermediate waveguide crosses at least one of said input waveguides.

4. The optical switch array of claim 3, wherein one of said at least one input waveguide crossed by said each intermediate waveguide is said first input waveguide.

5. The optical switch array of claim 2, wherein said input waveguides are substantially parallel, and wherein, for each said output waveguide of said first group, said switching elements that couple said input waveguides to said each output waveguide are mutually displaced along said input waveguides.

6. The optical switch array of claim 5, wherein said mutual displacement is such that, for each said output waveguide of said first group other than a last said output waveguide of said first group, said intermediate waveguide that couples a last said input waveguide to said each output waveguide avoids said intermediate waveguide that couples a first said input waveguide to a next said output waveguide of said first group.

7. The optical switch of claim 5, wherein said mutual displacement is such that, for each said output waveguide of said first group and for each said input waveguide other than a last said input waveguide, said intermediate waveguide that couples said each input waveguide to said each output waveguide avoids said intermediate waveguide that couples a next said input waveguide to said each output waveguide.

8. The optical switch array of claim 1, wherein said input waveguides are substantially parallel, and wherein, for each said output waveguide of said first group, said switching elements that couple said input waveguides to said each output waveguide are mutually displaced along said input waveguides.

9. The optical switch array of claim 1, wherein said switching elements are 1×2 switches.

10. The optical switch array of claim 9, wherein each of said 1×2 switches is selected from the group consisting of directional couplers, BOA couplers, digital-optical-switches and x-switches.

11. The optical switch array of claim 1, wherein said combining mechanism includes, for each of said input waveguides, a coupling element coupling said each input waveguide to said each output waveguide of said first group.

12. The optical switch array of claim 11, wherein said coupling elements are y-junction combiners.

13. The optical switch array of claim 12, wherein said y-junction combiners are passive.

14. The optical switch array of claim 12, wherein at least one of said y-junction combiners is active.

15. The optical switch array of claim 14, wherein said at least one active y-junction combiner is selected from the group consisting of directional couplers, BOA couplers, digital-optical-couplers and x-switches.

16. The optical switch array of claim 1, wherein said combining mechanism includes a planar lens.

17. The optical switch of claim 1, further comprising:
   (e) for each of said input waveguides, an auxiliary waveguide substantially parallel to said each input waveguide;
   (f) a second group of at least one output waveguide;
   (g) for each of said at least one output waveguide of said second group:
      for each of said input waveguides, a switching element coupling said auxiliary waveguide only to said each output waveguide of said second group; and
   (h) for each of said at least one output waveguides of said second group, a combining mechanism for coupling all of said auxiliary waveguides to said each output waveguide of said second group;
   said input waveguides, said output waveguides, said auxiliary waveguides, said switching elements and said combining mechanism all being arranged substantially in a common plane.

18. The optical switch of claim 17, wherein said second group includes a plurality of output waveguides, and wherein all of said auxiliary waveguides traverse respective said switching elements, that couple said auxiliary waveguides to said output waveguides of said second group, in a common order relative to said output waveguides of said second group.

19. The optical switch of claim 17, wherein, for each of said input waveguides, said auxiliary waveguide is coupled to said each input waveguide by a splitting switch.

20. The optical switch of claim 19, wherein said output waveguides of said first group are on a first side of said input waveguides and said auxiliary waveguides in said common plane, and wherein said output waveguides of said second group are on a second side of said input waveguides and said auxiliary waveguides in said common plane.

21. The optical switch of claim 17, wherein, for each of said input waveguides, said auxiliary waveguide is coupled to said each input waveguide by a 50% coupler and by a reflector that is substantially perpendicular to said each input waveguide and to said auxiliary waveguide.

22. A method for switching signals from at least one of at least three input channels to at least one of at least three output channels, each output channel receiving signals from only one input channel, comprising the steps of:
   (a) providing an optical switch array including:
      (i) at least three input waveguides, each of said input waveguides corresponding uniquely to one of the input channels,
      (ii) at least three output waveguides, each of said output waveguides corresponding uniquely to one of the output channels, (iii) for each of said output waveguides:
for each of said input waveguides, a switching element coupling said each input waveguide only to said each output waveguide, and
(iv) for each of said output waveguides, a combining mechanism for coupling all of said input waveguides to said each output waveguide,
said input waveguides, said output waveguides, said switching elements and said combining mechanism all being arranged substantially in a common plane, all of said input waveguides traversing successively respective said switching elements in a common order relative to said output waveguides; and
(b) for each of said output waveguides:
setting said switching element, that couples said each output waveguide to said input waveguide that corresponds to the input channel wherefrom a signal is to be switched to the output channel corresponding to said each output waveguide, to divert at least a portion of said signal to said each output waveguide.

23. The method of claim 22, further comprising the step of:
(c) for each of said output waveguides:
setting at least one other said switching element, that couples to said each output waveguide, to a straight-through state.

24. A method for multicasting from at least one of at least three input channel to at least two of at least three output channels, each output channel receiving input from only one input channel, comprising the steps of:
(a) providing an optical switch array including:
(i) at least three input waveguides, each of said input waveguides corresponding uniquely to one of the input channels,
(ii) at least three output waveguides, each of said output waveguides corresponding uniquely to one of the output channels,
(iii) for each of said output waveguides:
for each of said input waveguides, a switching element coupling said each input waveguide only to said each output waveguide, thereby coupling the input channel corresponding to said each input waveguide to the output channel corresponding to said output waveguide, and
(iv) for each of said output waveguides, a combining mechanism for coupling all of said input waveguides to said each output waveguide,
said input waveguides, said output waveguides, said switching elements and said combining mechanisms all being arranged substantially plane, all of said input waveguides traversing successively respective said switching elements in a common order relative to said output waveguides; and
(b) for each output channel:
setting said switching element, that couples said each output channel to the input channel wherefrom a signal is to be switched to said each output channel, to divert at least a portion of said signal to said each output channel,
at least one said switching elements being set to divert only a portion of said signal.

25. The method of claim 24, further comprising the step of:
(c) for said each output channel:
setting at least one switching element, that couples to said each output channel, to a straight-through state.

* * * * *